United States Patent [19]
Mezger et al.

[11] Patent Number: 5,349,935
[45] Date of Patent: Sep. 27, 1994

[54] TANK-VENTING SYSTEM AND MOTOR VEHICLE HAVING THE SYSTEM AS WELL AS A METHOD AND AN ARRANGEMENT FOR CHECKING THE OPERABILITY OF THE SYSTEM

[75] Inventors: Manfred Mezger, Tamm; Andreas Blumenstock, Ludwigsburg; Rainer Frank, Sachsenheim, all of Fed. Rep. of Germany

[73] Assignee: Robert Bosch GmbH, Stuttgart, Fed. Rep. of Germany

[21] Appl. No.: 30,314
[22] PCT Filed: Jun. 19, 1992
[86] PCT No.: PCT/DE92/00502
§ 371 Date: Mar. 24, 1993
§ 102(e) Date: Mar. 24, 1993
[87] PCT Pub. No.: WO93/02283
PCT Pub. Date: Feb. 4, 1993

[30] Foreign Application Priority Data
Jul. 24, 1991 [DE] Fed. Rep. of Germany ....... 4124465

[51] Int. Cl.$^5$ ............................................. F02M 33/02
[52] U.S. Cl. ............................... 123/520; 123/198 D
[58] Field of Search ............... 123/520, 521, 518, 516, 123/519, 198 D

[56] References Cited

U.S. PATENT DOCUMENTS

| | | | |
|---|---|---|---|
| 3,082,597 | 3/1963 | Hamblin | 60/307 |
| 3,934,413 | 1/1976 | Beiswenger | 60/307 |
| 4,070,828 | 1/1978 | Barres | 60/274 |
| 4,862,856 | 9/1989 | Yokoe | 123/519 |
| 5,146,902 | 9/1992 | Cook | 123/198 D |
| 5,158,054 | 10/1992 | Otsuka | 123/198 D |
| 5,186,153 | 2/1993 | Steinbrenner | 123/198 D |
| 5,193,512 | 3/1993 | Steinbrenner | 123/519 |
| 5,195,498 | 3/1993 | Siebler | 123/520 |
| 5,197,442 | 3/1993 | Blumenstock | 123/198 D |

FOREIGN PATENT DOCUMENTS

| | | |
|---|---|---|
| 4012111 | 3/1991 | Fed. Rep. of Germany . |
| 0164763 | 12/1980 | Japan ................... 123/518 |

*Primary Examiner*—Carl S. Miller
*Attorney, Agent, or Firm*—Walter Ottesen

[57] ABSTRACT

A tank-venting system has the following features: a tank 10; an adsorption filter 13 which is connected to the tank via a tank-connecting line 12 and which has a venting line 14 which can be closed off by a shut-off valve 15; and, a tank-venting valve 16 which is connected to the adsorption filter via a valve line 17; a pressure connection 21 on the valve line close to the tank-venting valve; and, a pressure sensor 11 on the tank.

With the aid of this tank-venting system, the following method can be carried out: closing the tank-venting valve and the shut-off valve; supplying compressed air to the pressure connection; measuring the pressure in the tank; and, checking if the pressure satisfies a pre-given pressure condition and determining the tank-venting system as being inoperable in the event that this is not the case.

The above system can be reliably checked as to operability with the aid of the above method, since test pressures can be set which lie significantly above the pressures present in a tank-venting system, these pressures occurring without externally applied pressure. The test pressures can be set without the risk of damage to the system.

9 Claims, 2 Drawing Sheets

5,349,935

TANK-VENTING SYSTEM AND MOTOR VEHICLE HAVING THE SYSTEM AS WELL AS A METHOD AND AN ARRANGEMENT FOR CHECKING THE OPERABILITY OF THE SYSTEM

FIELD OF THE INVENTION

The following relates to a tank-venting system for a motor vehicle and a motor vehicle having the system as well as a method and an arrangement for checking the operability of a tank-venting system.

BACKGROUND OF THE INVENTION

A tank-venting system typically has the following components: a tank having a tank closure device; an adsorption filter with a venting line; a tank-venting valve; a tank connecting line between the tank and the adsorption filter; and, a valve line between the adsorption filter and the tank-venting valve.

The tank-venting valve is connected to the intake pipe of an internal combustion engine so that fuel vapors are drawn out of the tank-venting system with the aid of the underpressure in the intake pipe. During this process, the adsorption filter is regenerated with the aid of air which is drawn in via the venting line.

There is the danger that tank-venting systems develop leaks or that obstructions arise. Such systems therefore have to be repeatedly checked as to operability during the operation of a motor vehicle.

The most important method for checking the operability of a motor vehicle tank-venting system is based on a proposal of the California Environmental Authority CARB. According to this method, for opening the tank-venting valve, a check is made as to whether a lambda controller has to carry out a correction of its control output in the direction of a lean mixture. This is always the case when air with fuel vapor is evacuated by suction from the tank-venting system. However, it is also the case that the adsorption filter can be completely regenerated and that the fuel in the tank is completely evaporated. When the tank-venting valve is opened, no fuel is supplied in addition to that which is supplied to the injection valves of the internal combustion engine according to the control output of the lambda control. In such a case, the lambda controller does not have to carry out a correction and it is unclear whether the tank-venting system has developed a leak or whether no fuel is being supplied because of the mentioned reasons. In order to be able to decide this question, according to the known method, an evaluation of the signal from the lambda controller only occurs when a fuel temperature sensor indicates that a predetermined minimum fuel temperature is exceeded and a tank level sensor indicates that the vehicle tank has been filled. It is assumed that fuel vapor would then have to be present in the system in any event which vapor is drawn off when the tank-venting valve is opened and which then leads to a correction of the lambda controller. However, with this method, incorrect decisions repeatedly occur if there is in fact evaporated fuel in the tank, refilling occurs with the same kind of fuel and the adsorption filter is largely regenerated.

A tank-venting system is described in U.S. Pat. No. 5,193,512 which includes a controllable shut-off valve in the venting line of the adsorption filter. This shut-off valve makes it possible to carry out a method wherein the shut-off valve is closed, the tank-venting valve is opened and then a check is made as to whether an underpressure is building up in the tank. If this is the case, it is concluded that the system is operable.

Erroneous decisions can be made in the above-mentioned method when the fuel vaporizes with great intensity. Furthermore, it is necessary to carry out a special test cycle with the shut-off valve closed wherein the adsorption filter cannot be regenerated.

Accordingly, the problem is presented to provide an especially reliable method for checking the operability of the tank-venting system for a motor vehicle as well as to provide an arrangement for carrying out such a method and a tank-venting system having an operability which can be checked both reliably and to a great extent.

SUMMARY OF THE INVENTION

The tank-venting system of the invention includes the components of the usual system mentioned above and is characterized by the following features: a pressure connection on the valve line close to the tank-venting valve; a pressure sensor in the tank and, a shut-off valve in the venting line.

Compressed air can be conducted to a pressure connection from a compressed-air source which belongs to the tank-venting system itself. However, it is more advantageous to switch over the compressed-air source which is, in any event, available on the motor vehicle, for example, the compressed-air source of a secondary air source, a turbocharger or a brake air compressor. Accordingly, the motor vehicle of the invention includes the following features: an internal combustion engine; a tank-venting system according to the invention; a compressed-air source; and, a switch-over valve for selectively switching the air of the compressed-air source to the pressure connection on the valve line of the tank-venting system.

A tank-venting system having a compressed-air connection close to the tank-venting valve, a pressure sensor on the tank, and a shut-off valve in the venting line can be checked as to operability in accordance with the invention as follows: closing the tank-venting valve and the shut-off valve in the venting line; supplying compressed air; measuring the pressure in the tank; and, checking whether the pressure satisfies a pregiven pressure condition and determining that the tank-venting system is not operational in the event that this is not the case.

The arrangement according to the invention for checking the operability of a tank-venting system includes units for carrying out the above-mentioned steps.

It is of special advantage not to provide a pressure sensor on the tank which measures the absolute pressure in the tank; instead, to provide a sensor which operates as a differential-pressure sensor which measures the pressure difference between the pressure in the tank and the ambient pressure.

In connection with the above-mentioned teaching, it should be noted that a tank-venting system must be pressure-tight up to a differential pressure of 5000 Pascal (0.5 bar) with respect to the ambient pressure. However, in normal operation, only differential pressures of a maximum of a few 10 mbar occur when a large amount of vapor is generated from a sudden intense sloshing of the tank content and the tank is relatively full. A wide pressure range lies between these few 10 mbar and the 500 mbar which the tank must at least be able to withstand. In this pressure range, the tank-venting system can be reliably checked as to tightness and blockages. For example, a test pressure of 100 millibar can be specified. This lies significantly above the maximum obtainable values during normal operation and is significantly below the values which can lead to rapid deterioration of the tank with frequent repetition.

DESCRIPTION OF THE PREFERRED EMBODIMENTS OF THE INVENTION

Figure 1:
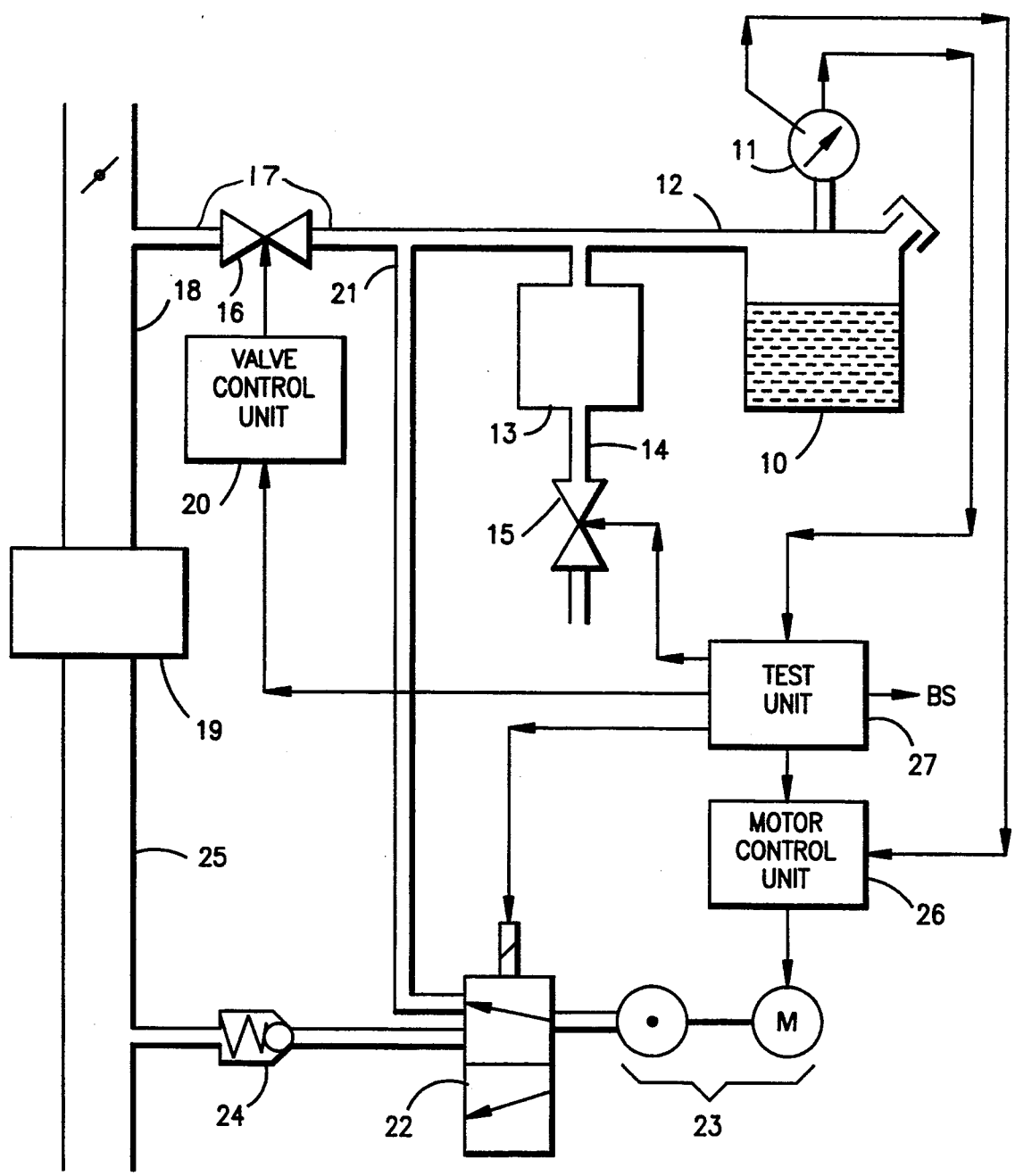
FIG. 1 is a schematic illustration of a tank-venting system having a compressed-air supply and a test arrangement; and, FIG. 2 is a flowchart for explaining a method carried out with the test arrangement of FIG. 1.

The tank-venting system shown in FIG. 1 includes a tank 10 having a differential-pressure sensor 11, an adsorption filter 13 and a tank-venting valve 16. The adsorption filter 13 is connected to the tank via a tank-connecting line 12 and has a venting line 14 with a shut-off valve 15 inserted therein. The tank-venting valve 16 is disposed in a valve line 17 which connects the adsorption filter 13 to the intake pipe 18 of an internal combustion engine 19. The tank-venting valve 17 is driven by a valve-control unit 20 in dependence upon the time and on the operating state of the engine 19.

A compressed-air connection 21 is disposed in the valve line 17 on the side facing toward the adsorption filter 13 and is close to the tank-venting valve 16. Compressed air can be conducted from a secondary air pump 23 via an electromagnetically driven 3/2 directional valve 22 to the compressed-air connection 21. The corresponding switching position of the 3/2 directional valve 22 is shown in FIG. 1. In the other switching position, the air is supplied by the secondary air pump 23 via a check valve 24 to the exhaust-gas channel 25 of the internal combustion engine 19.

An increasing number of motor vehicles is equipped with a secondary air pump which operates to conduct air to the exhaust gas in the warm-running state of the engine in order, in combination with this air, to reduce uncombusted constituents in the exhaust gas which are present to an especially high extent during the warm-running state since, in this operating state, a rich mixture is supplied to the internal combustion engine. However, conventional systems do not have a check valve 24. This valve is present to prevent a penetration of hot exhaust gases into the tank 10 in the event that the 3/2 directional valve 22 leaks. In the same manner, a check valve is purposeful at the suction end of the internal combustion engine when a turbocharger is used as a compressed-air source. In this case too, hot gas from the engine can penetrate into the tank. In contrast, a check valve can be omitted when compressed air from a brake-air compressor is used.

In FIG. 1, a motor-control unit for driving the motor of a secondary air source 23 and a test unit 27 are shown. The test unit 27 operates to carry out the test sequence for checking the operability of the tank-venting system. To start a check sequence, the test unit 27 supplies signals to the tank-venting valve 16, the shut-off valve 15, the 3/2 directional valve 22 and the secondary air source 23. By closing the tank-venting valve 16 and the shut-off valve 15, the signals ensure that the tank-venting system is separated from the ambient and that compressed air is supplied thereto. The test unit 27 then evaluates the signal from the differential-pressure sensor 11 on the tank 10 for checking.

Figure 2:
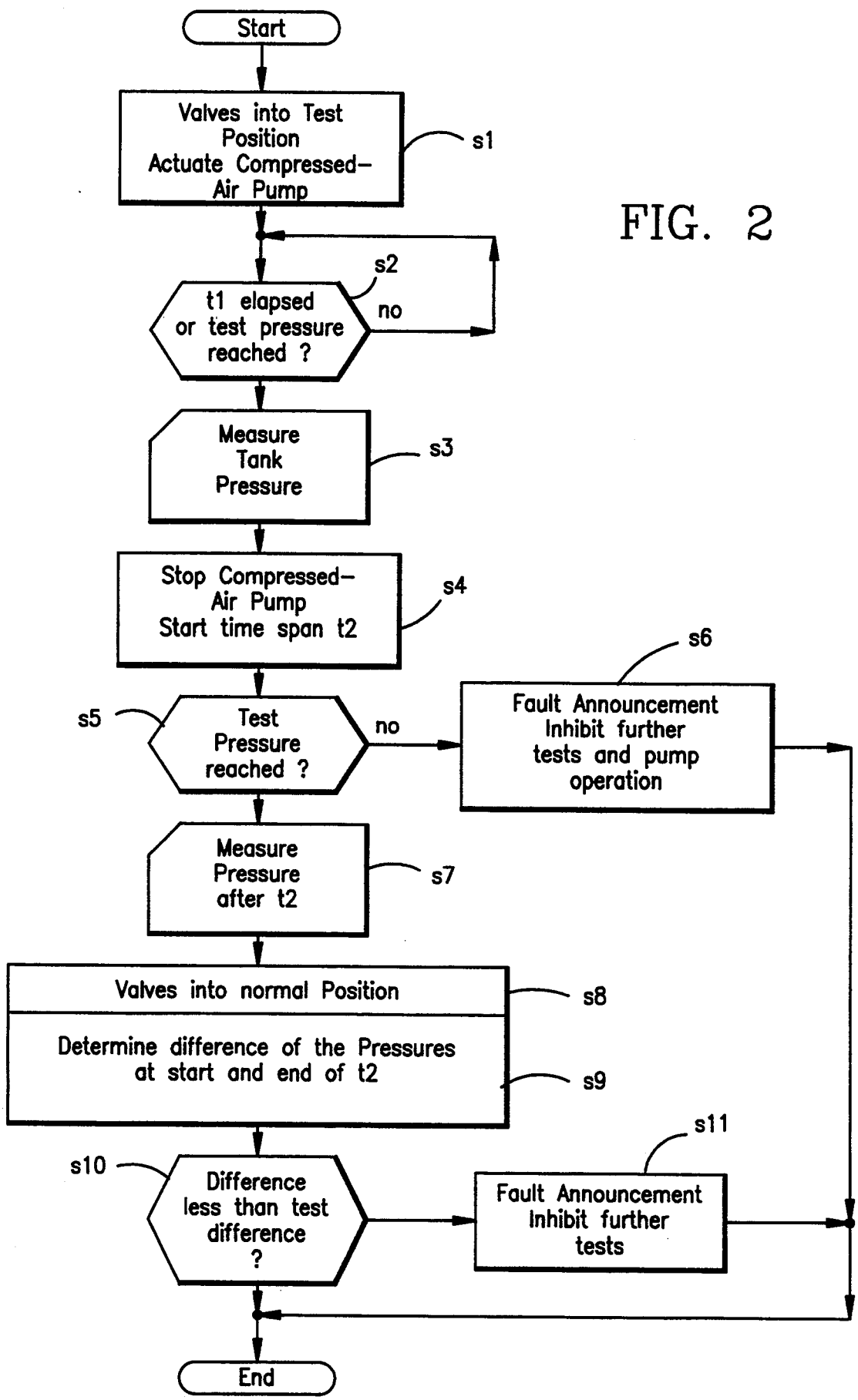

The test method which is carried out by the test unit 27 in accordance with the preferred embodiment, is described in the following with respect to the flowchart of FIG. 2.

After the start of the method, the valves mentioned in the above paragraph are brought into the test positions mentioned in this paragraph and the secondary air pump 23 is actuated (step s1). In a step s2, a check is made whether a pregiven time span t1 has elapsed or if an upper test pressure is reached since completing step s1. The attainment of the upper test pressure can be checked either with software means or hardware means. In the first case, the actual pressure announced by the differential-pressure sensor 11 is detected with each run-through of step s2 and is compared to the upper test pressure. In the solution using hardware, a contact is present on the differential-pressure sensor 11 which emits a signal when the upper test pressure is reached and which triggers an interrupt by means of which the program executed by the test unit 27 is advised that the upper test pressure has been reached. It is also possible in step s2 to only undertake a check as to the elapse of a pregiven time span t1.

If the condition of step s2 is satisfied, the tank pressure is measured in a step s3 and thereafter (step s4), the secondary air pump 23 is switched off. Preferably, the 3/2 directional valve is at the same time switched into the position in which this valve connects the secondary air pump 23 to the exhaust-gas channel 25. It is here noted that a 3/3 directional valve can be provided in lieu of the 3/2 directional valve. The 3/3 directional valve blocks the passage of air from the input line to each of the two output lines in a further position not shown in FIG. 1. In step s4, a time span t2 is started which is required for a supplemental test which is carried out in a preferred embodiment starting with step s7.

In a step s5, a check is made whether the measured tank pressure has reached the upper tank pressure. These steps are especially then necessary when only the elapse of time span t1 is checked in step s2. If in contrast, a check was also made as to whether the upper test pressure had been reached, a check is only to be made as to whether a movement occurred out of step s2 because of the elapse of the time span t1 or because the upper tank pressure was reached. If the upper tank pressure was reached, then it is directly clear that the upper test pressure is present and step s7 follows. Otherwise, as in the case of a negative answer to the inquiry in step s5, a step s6 follows wherein a fault announcement takes place that the tank-venting system is not operable irrespective of whether the cause is a blockage between the tank-venting valve and the tank or because of a large leak or finally, because of a fault in the compressed-air supply. At the same time, further tests are inhibited and any operation of the secondary air source is inhibited even such a test as with a new warm-running of the internal combustion engine 19. This is the case because, as already mentioned, a fault in the compressed-air supply cannot be excluded and, accordingly, a connection between the exhaust-gas channel 25 and the tank 10 also cannot be excluded. If another compressed-air source is used and especially a brake-air compressor, then the compressed-air source can be further operated even in a fault situation which means, in the case of the compressed-air supply via the brake-air compressor, that the entire vehicle can continue to be operated. The end of the method is reached after step s6.

The required minimum length of the time span t1 is dependent upon the compressed-air source used. A secondary air pump is a relatively weak compressed-air source which typically supplies 400 l/min at a pressure of approximately 1 bar. A test pressure of, for example 100 mbar, is reached within several seconds so that the time span t1 can be set, for example, to 5 seconds. The time span can be still shorter in the case of the air supply via a brake-air compressor. To protect the tank against overpressure, either a pressure-reducing valve between the compressed-air source and the tank-venting system must be present or the differential-pressure sensor 11 must immediately switch back the above-mentioned valves into the normal position as soon as the upper test pressure of 100 mbar is reached.

With the method sequence described up until now, it is not possible to determine small leaks such as holes of only 1 mm diameter since the compressed-air source supplies so much air that the loss through the small leak is more than compensated. A sequence follows as will be explained with respect to steps s7 to s11 of the flowchart of FIG. 2 in order also to be able to determine small leaks. This sequence serves to check whether the pressure in the closed tank-venting system drops off with unexpected intensity after switching off the compressed-air supply.

In step s7, the tank pressure (tank-differential pressure) is measured after time span t2 has elapsed which was set in step s4. Thereafter (step s7), the shut-off valve 15 is opened and the tank-venting valve 16 is driven in the manner given by the valve-control unit 20 so that the tank-venting system again operates as such. The pressures measured in the steps s4 and s8 are measured at the start and end of the time span t2. From these pressures, the difference (step s9) is computed and a check is made (step s10) as to whether this difference is less than a test difference. If this is the case, the end of the method is reached. Otherwise, a fault announcement is emitted (step s11) and a further check of the system is inhibited. The end of the method has also been reached.

Approximately 5 l/min are lost through a hole having a diameter of 1 mm at a pressure of 100 mbar. This means that even for a large tank which is almost empty, the pressure drops within approximately 20 seconds from 100 mbar to approximately 7 mbar. In this case, the value of 20 seconds can be set as time span t2 and the value of 30 mbar can be set as the test difference.

The test pressure can always be fixed at the start of the time span t2, for example, for the reason that the air supply is interrupted immediately as soon as the upper test pressure, for example, 100 mbar is reached. When the test pressure is fixed, it is not necessary to execute step s9; instead, a check can be made directly after the measurement of the pressure in step s8 as to whether this pressure has dropped below a lower test pressure which in the example is 70 mbar.

In practice, it is advantageous not to emit the fault announcements of steps s6 or s11 at the first determination of a fault; instead, it is advantageous to once again run through the test routine and to activate a fault announcement only after a second determination of a fault.

We claim:

1. A tank-venting system adapted to operate with an internal combustion engine having an intake pipe comprising:
   a tank;
   an adsorption filter;
   a tank-connection line connecting said adsorption filter to said tank;
   said adsorption filter having a venting line;
   a tank-venting valve;
   a first valve line segment connecting said tank-venting valve to the intake pipe;
   a second valve line segment connecting said tank-venting valve to said adsorption filter;
   pressure supply means for supplying air under pressure to said second valve line segment;
   a pressure sensor on said tank; and,
   a shut-off valve in said venting line.

2. A motor vehicle comprising:
   an internal combustion engine having an exhaust-gas channel;
   a compressed-air source for supplying compressed air;
   a tank-venting system including: a tank; an adsorption filter; a tank-connection line connecting said adsorption filter to said tank; said adsorption filter having a venting line; a tank-venting valve; a valve line connecting said tank-venting valve to said adsorption filter; a pressure connection connected to said valve line close to said tank-venting valve; a pressure sensor on said tank; and, a shut-off valve in said venting line; and,
   a switch-over valve for selectively switching over the compressed air from the compressed-air source to said pressure connection connected to said valve line of the tank-venting system in a first position of said switch-over valve.

3. The motor vehicle of claim 2, wherein said compressed-air source is a secondary-air pump; and, the motor vehicle further comprising:
   a check valve connected between said switch-over valve and said exhaust-gas channel of said internal combustion engine; and, said check valve being connected to said secondary air pump in a second position of said switch-over valve so as to permit said check valve to open in response to the pressure of the air from said secondary-air pump.

4. A method for checking the operability of a tank-venting system having a tank, an adsorption filter, which is connected to the tank via a tank-connecting line and has a venting line, and a tank-venting valve which is connected to the adsorption filter via a valve line, the method comprising the steps of:
   closing the tank-venting valve and the venting line with the aid of a shut-off valve arranged on the venting line;
   supplying compressed air to the tank-venting system at the end of the tank-venting valve which faces toward the adsorption filter;
   measuring the pressure in the tank; and,
   checking if the pressure satisfies a pregiven pressure condition and determining the tank-venting system as being inoperable in the event that this is not the case.

5. The method of claim 4, further comprising the step of, as a pressure condition, checking to determine if an upper test pressure is reached or exceeded.

6. The method of claim 4, further comprising the steps of: checking the pressure drop in the tank after a pregiven pressure has been exceeded and the supply of compressed air has been terminated; and, determining the tank-venting system as being operable if the pressure drop remains below a test difference, otherwise, determining that the system is inoperable.

7. The method of claim 6, further comprising the step of: checking the pressure drop by measuring the pressure after a pregiven time span after terminating the supply of compressed air; and, determining the difference between the pressure at the last-mentioned measurement and the pressure measured at the start of the time span.

8. An arrangement for checking the operability of a tank-venting system having a tank, an adsorption filter, which is connected to the tank via a tank-connecting line and has a venting line and a tank-venting valve, which is connected to the adsorption filter via a valve line, the arrangement comprising: a drive unit for driving the tank-venting valve; a shut-off valve for the venting line, and a compressed air supply which supplies compressed air to the tank-venting system at the end of the tank-venting valve facing toward the adsorption filter so that an overpressure builds up in the tank when in good working order; and, a test unit for checking the pressure in the tank when supplying the same with compressed air and for determining the tank-venting system as being not operable when the checked pressure does not satisfy a pregiven pressure condition.

9. An arrangement for checking the operability of a tank-venting system having a tank, an adsorption filter, which is connected to the tank via a tank-connecting line and has a venting line, and a tank-venting valve, which is connected to the adsorption filter via a valve line, the arrangement comprising:
- means for closing the tank-venting valve and the venting line with the aid of a shut-off valve mounted in the venting line;
- means for supplying compressed air to the tank-venting system at the end of the tank-venting valve facing toward the adsorption filter;
- means for measuring the pressure in the tank; and,
- means for checking whether the pressure of a pregiven pressure condition is satisfied and to determine that the tank-venting system is not operable in the event that this is not the case.

* * * * *